United States Patent [19]
Yoshida et al.

[11] Patent Number: 4,489,873
[45] Date of Patent: Dec. 25, 1984

[54] INTERMITTENT FEED MECHANISM

[75] Inventors: Hiroshi Yoshida; Shunji Akashi, both of Kurobe; Kazuki Kuse, Toyama, all of Japan

[73] Assignee: Yoshida Kogyo K.K., Tokyo, Japan

[21] Appl. No.: 489,125

[22] Filed: Apr. 27, 1983

[30] Foreign Application Priority Data

Apr. 28, 1982 [JP] Japan .................... 57-71762

[51] Int. Cl.³ .................... B65H 17/36; B65H 17/44
[52] U.S. Cl. .................... 226/162; 226/150; 226/165; 226/167; 414/20
[58] Field of Search ............ 226/165, 162, 167, 139, 226/146, 149, 150, 164; 198/712; 414/20; 83/247, 206, 277, 259

[56] References Cited

U.S. PATENT DOCUMENTS

| | | | |
|---|---|---|---|
| 693,099 | 2/1902 | Bayler | 83/247 |
| 1,376,668 | 5/1921 | Blomberg et al. | 226/165 X |
| 2,968,430 | 1/1961 | Martin et al. | 226/162 X |
| 3,956,917 | 5/1976 | Kerseg | 226/165 X |
| 4,160,518 | 7/1979 | Scribner | 226/162 X |
| 4,306,477 | 12/1981 | Travis | 226/162 X |

FOREIGN PATENT DOCUMENTS

| | | | |
|---|---|---|---|
| 768151 | 8/1934 | France | 226/162 |
| 737771 | 9/1955 | United Kingdom | 226/162 |
| 1260661 | 1/1972 | United Kingdom | 226/162 |

OTHER PUBLICATIONS

Dennis, R. E., IBM Technical Disclosure Bulletin, vol. 11, No. 7, Dec. 1968.

Primary Examiner—Billy J. Wilhite
Assistant Examiner—Scott J. Haugland
Attorney, Agent, or Firm—Hill, Van Santen, Steadman & Simpson

[57] ABSTRACT

A mechanism, for intermittently feeding a tape-like article along a longitudinal path, comprises a slide having a first clamping jaw and reciprocably movable parallel to the longitudinal path, and a second clamping jaw carried by the slide and movable relatively thereto toward and away from the first jaw to clamp and release the tape-like article. At the end of the slide's forward movement, the second jaw is moved away from the first jaw and is locked in such "releasing" position. At the end of the slide's backward movement, the second jaw is unlocked and thereby returned to its "clamping" position.

5 Claims, 5 Drawing Figures

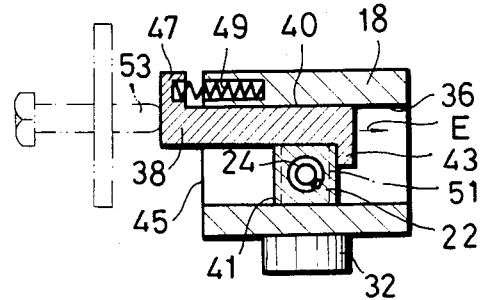
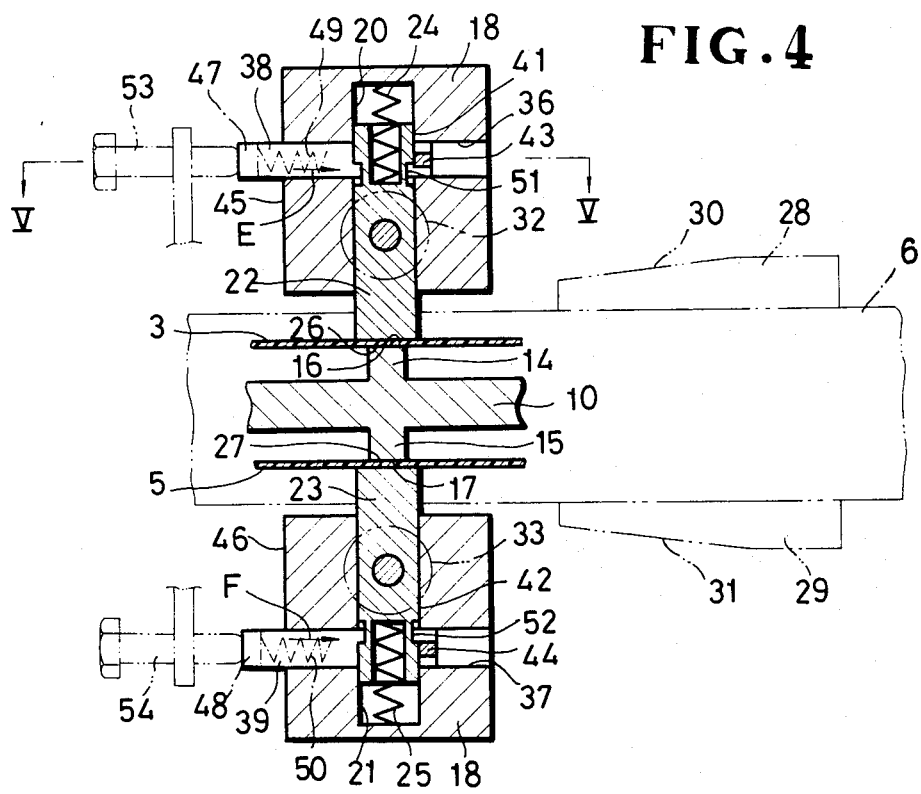

INTERMITTENT FEED MECHANISM

BACKGROUND OF THE INVENTION

1. Field of the Invention:

The present invention relates to a mechanism for intermittently feeding a continuous length of film strip, tape or the like.

2. Prior Art:

There have hitherto been proposed various mechanisms for feeding a continuous tape-like article stepwise, i.e. in uniform steps of a predetermined length. However, most of the prior mechanisms are relatively complex in construction that requires replacement of parts in order to adjust or change the extent to which the tape-like article is to be fed in each step. Another common problem with the prior mechanisms is that the tape-like article tends to slip on the feed parts; this slipping causes inaccurate stepwise feeding of the tape-like article.

SUMMARY OF THE INVENTION

According to the present invention, a mechanism for intermittently feeding a tape-like article along a longitudinal path, comprises a slide, having a first clamping jaw which is reciprocably movable parallel to the longitudinal path, and a second clamping jaw carried by the slide which is movable relatively thereto toward and away from the first jaw to clamp and release the tape-like article. At the end of the slide's forward movement, the second jaw is moved away from the first jaw and is locked in such "releasing" position. At the end of the slide's backward movement, the second jaw is unlocked and thereby returned to its "clamping" position.

It is therefore an object of the invention to provide an intermittent feed mechanism of a simple construction that enables accurate stepwise feeding of a tape-like article.

Another object of the invention is to provide an intermittent feed mechanism in which the amount of feed in a single step can be changed or adjusted merely by adjusting the position of a cam plate.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a cross-sectional view taken along line IV—IV of FIG. 3; and

FIG. 5 is a cross-sectional view taken along line V—V of FIG. 4.

DETAILED DESCRIPTION

Figure 1:
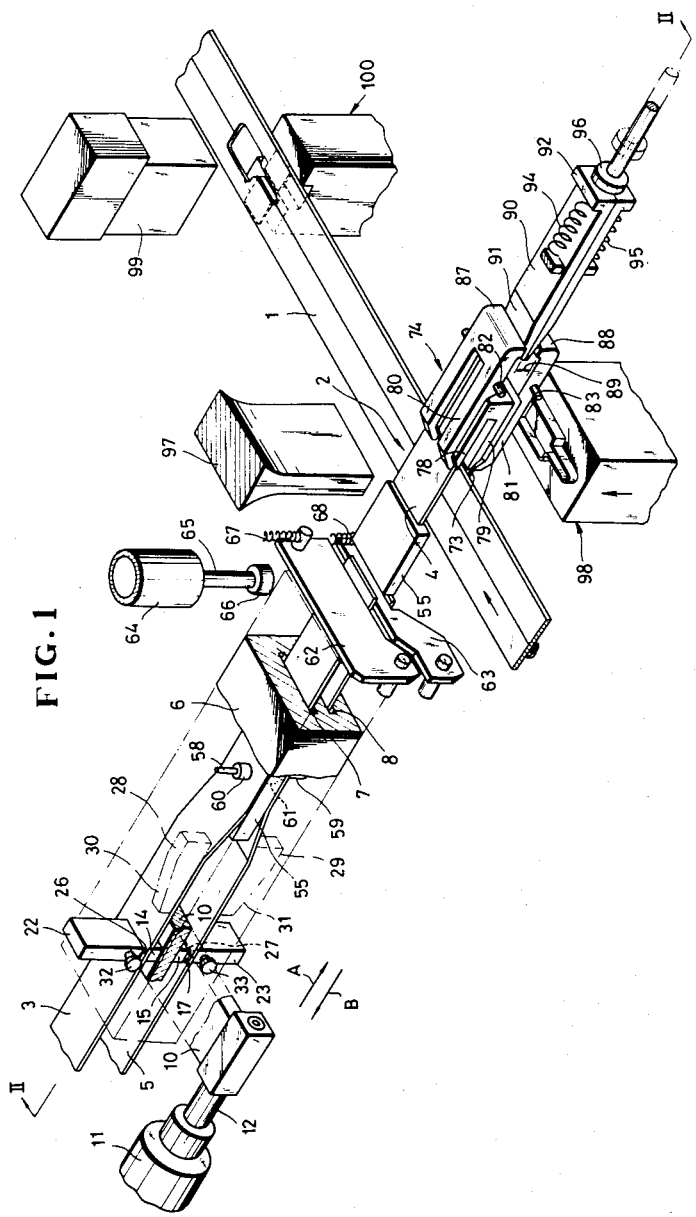
FIG. 1 is a fragmentary perspective view, with parts omitted, of a reinforcing-film applying apparatus having an intermittent feed mechanism embodying the present invention.

FIG. 1 schematically shows an apparatus for applying reinforcing film pieces 4, 73 of thermoplastic synthetic resin to a slide fastener chain 1 at longitudinally spaced locations 2. Such apparatus is in part more fully disclosed in our copending application for U.S. patent, Ser. No. 489124, filed on even date herewith, which is hereby incorporated by reference. In the reinforcing-film applying apparatus, there are a first working station where a shaping die 98 and a coacting ultrasonic horn 97 are located for a purpose described below, and a second working station where a heating die 100 and a coacting heating punch 99 are located for a purpose described below, the first and second working stations being spaced apart from one another along a longitudinal horizontal path along which the slide fastener chain 1 is fed in uniform steps of a predetermined distance equal to the length of individual slide fasteners (not shown) to be produced.

At the first working station, a pair of reinforcing film pieces 4, 73, having severed from a pair of continuous strips 3, 5 in a manner described below, is placed transversely on oposite surfaces of the fastener chain 1 at one of the longitudinally spaced locations 2 while the fastener chain 1 is at rest, whereupon the shaping die 98 and the ultrasonic horn 97 are moved toward one another to fuse the reinforcing film pieces 4, 73 to the opposed fastener stringers only at their inner marginal areas, and also to shape such fused portions into a suitable form. After that, when the reinforcing film pieces 4, 73 partially fused to the fastener chain 1 arrive at the second station as the fastener chain 1 is further moved along the path, the heating die 100 and punch 99 are moved toward one another to apply pressure and heat to the reinforcing film pieces 4, 73 and the opposed fastener stringers at their superposed areas except that the fused and shaped inner marginal portions.

Figure 2:
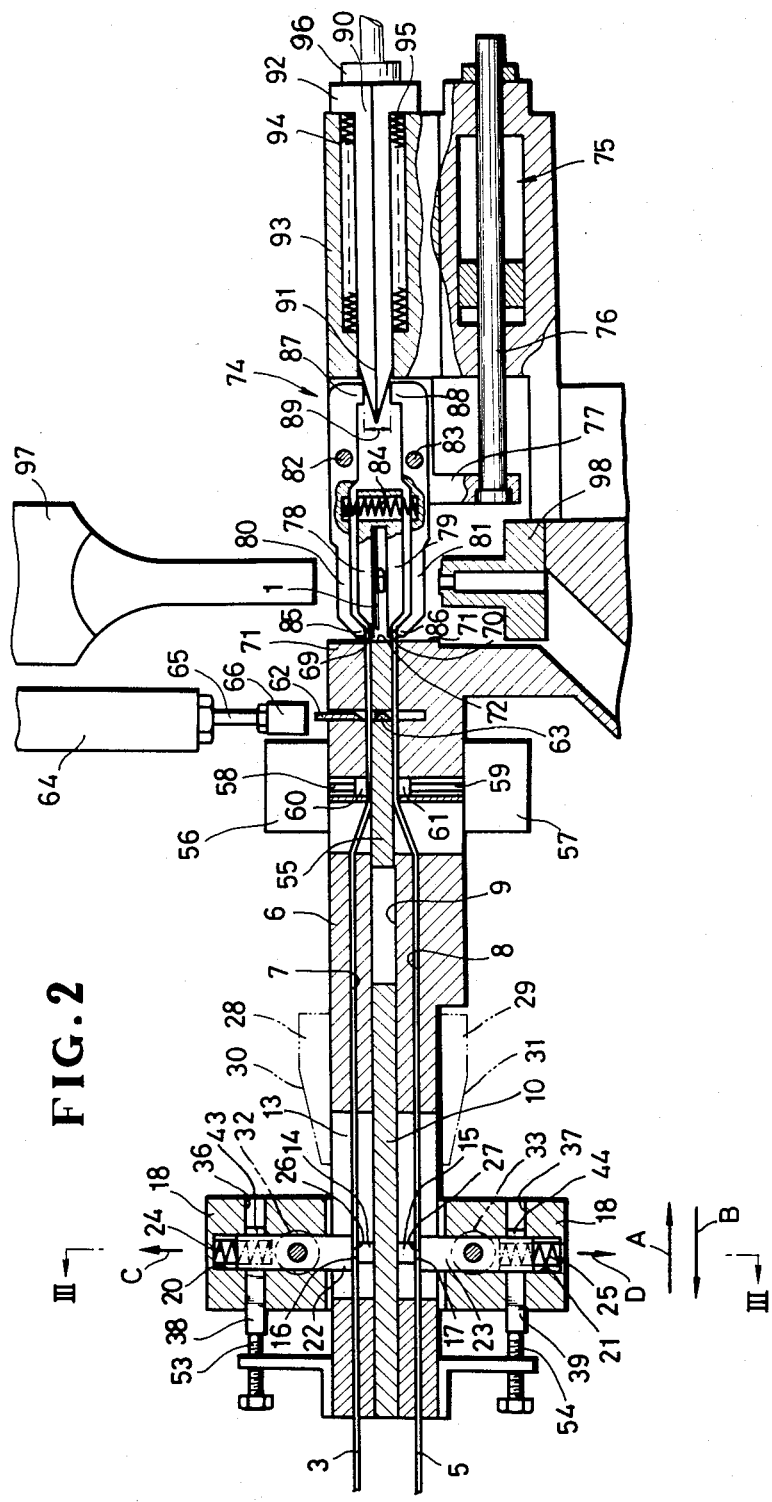
FIG. 2 is a longitudinal cross-sectional view taken along line II—II of FIG. 1.

As shown in FIGS. 1 and 2, the pair of continuous film strips 3, 5 is fed, in uniform steps of a predetermined distance equal to the length of individual reinforcing film pieces 4, 73 to be severed, to the first working station along a substantially horizontal path extending perpendiculary to the fastener chain's path by an intermittent feed mechanism embodying the present invention.

The feed mechanism comprises a fixed elongated guide block 6, partial broken away as shown in phanton lines, having a pair of parallel longitudinal guide channels 7,8 for the passage of the two reinforcing strips 3, 5. A slide 10 is slidably received in a longitudinal guide groove 9 of the guide block 6 and is movable relatively thereto parallel to the longitudinal path of the reinforcing film strips 3, 5. The slide 10 has a pair of first clamping jaws 14, 15 respectively projecting upwardly into an opening 13 and downwardly, and terminating in respective support surfaces 16, 17 for supporting the inner confronting surfaces of the two film strips 3, 5.

Figure 3:
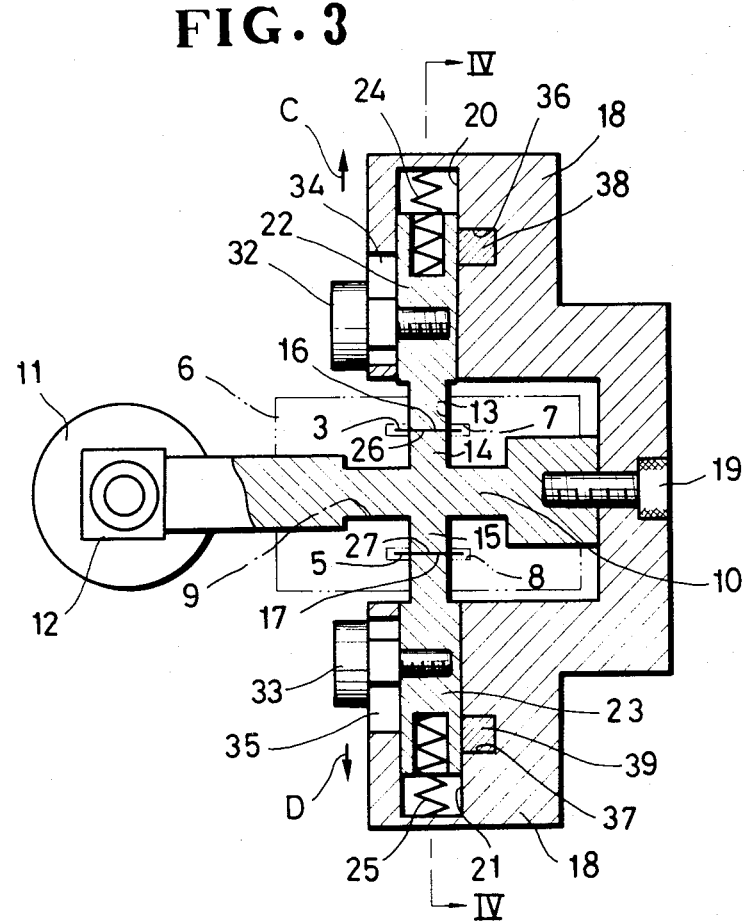
FIG. 3 is an enlarged cross-sectional view taken along line III—III of FIG. 2.

The slide 10 is connected to a reciprocating piston rod 12 of a fluid-pressurized cylinder 11 (FIGS. 1 and 3), and the slide 10 is thus reciprocably movable, in response to the reciprocating motion of the piston rod 12, on the guide block 6 parallel to the reinforcing film strip's path between an advanced or downstream position (not shown) and a retracted or upstream position (FIG. 2). A bracket 18 (FIGS. 2-5) is secured to the slide 10 by a bolt 19 and carries a pair of second clamping jaws 22,23 movable relatively to the bracket 18 perpendicularly to the reinforcing film strip's path between a "clamping" position in which the second jaws 22,23 are disposed close to the first jaws 14, 15, respectively, to clamp therewith the respective reinforcing film strips 3, 5, and a "releasing" position in which the second jaws 22, 23 are disposed away from the first jaws 14, 15, respectively, to release the respective film strips 3, 5. Each second jaw 22, 23 is slidably received in a respective vertical groove 20, 21, and is normally urged to the "clamping" position by a compression spring 24, 25 mounted between each second jaw 22, 23 and the bracket 18. Further, each second clamping jaw 22, 23 has a roller 32, 33.

A pair of cam plates 28, 29 (FIGS. 1, 2 and 4) is mounted on the guide block 6, each cam plate 28, 29 being disposed at an adjustable position near the end of the forward travel of the respective second clamping jaw 22, 23. Each cam plate 28, 29 has a cam surface 30, 31 slanting divergently downstream with respect to the longitudinal path of the respective film strip 3, 5; when the slide 6 approaches near the advanced position (not shown), the roller 32, 33 of each second clamping jaw 22, 23 rolls on and along the cam surface 30, 31 of the respective cam plate 28, 29, causing the respective second clamping jaw 22, 23 to be moved from the "clamping" position to the "releasing" position against the biasing force of the respective spring 24, 25.

Further, each second clamping jaw 22, 23 has a transverse recess 51, 52 (FIGS. 4 and 5). A pair of locking members 38, 39 (FIGS. 2, 3 and 4) is slidably mounted on the bracket 18, and each locking member 38, 39 has a projection 43, 44 which is engageable with the respective transverse recess 51, 52, when the second clamping jaws 22, 23 are in the "releasing" position. Each locking member 38, 39 is movable on the bracket 18 along a respective horizontal groove 36, 37 parallel to the reinforcing film strip's path between a "locking" position in which each projection 43, 44 is received in the respective transverse recess 51, 52, and an "unlocking" position in which each projection 43, 44 is retracted out of the respective transverse recess 51, 52. Each locking member 38, 39 is normally urged by a resepective spring 49, 50 (FIGS. 4 and 5) to the "locking" position. When the slide 10 is returned to the retracted position (FIGS. 2, 4 and 5), the locking members 38, 39 are engageable at their respective upstream ends with a pair of fixed rods 53, 54, respectively, for being moved from the "locking" position to the "unlocking" position against the biasing force of the respective springs 24, 25.

As shown in FIGS. 1 and 2, a pair of cutters 62, 63 is disposed upstream of the first station and is operable, in response to the downward movement of the pusher 66, to sever a pair of reinforcing film pieces 4, 73 from the respective continuous strips 3, 5. The pusher 66 is mounted on a free end of a reciprocating piston rod 65 projecting from a fluid-pressurized cylinder 64 which is operable in timed relation to the stepwise feed of the continuous film strips 3, 5; that is, the pusher 66 is lowered each time when the continuous film strips 3, 5 have been fed by a predetermined step length.

The extent to which the film strips 3, 5 are to be fed in a single step can be changed or adjusted by simply changing the position of the cam plate 28, 29 longitudinally of the gude block 6. But this step length or distance must be such that, when the continuous film strips 3, 5 have been fed in each step, their leading ends 69, 70 slightly project from both a front end surface 71 of the guide block 6 and a front end surface 72 of a fixed central plate 55, for a purpose described below.

A double gripper 74 (FIGS. 1 and 2) is mounted on a support 77 connected to a reciprocating piston rod 76 (FIG. 2) of an actuator 75. The double gripper 74 is movable forwardly and backwardly, in response to the reciprocating movement of the piston rod 76, across the first working station for gripping the respective leading ends 69, 70 of the severed reinforcing film pieces 4, 73 (FIG. 2), and for placing the same on opposite surfaces of the fastener chain 1 at one of the longitudinally spaced locations 2 having arrived at the first working station (FIG. 1).

The double gripper 74 comprises a pair of non-pivotable jaws 78, 79, a pair of pivotable jaws 80, 81, and an actuator cam 90. The upper and lower pivotable jaws 80, 81 are pivotally movable about a pair of pins 82, 83, respectively, i.e. relatively to the two non-pivotable jaws 78, 79, respectively, between a closed position and an open position. In the closed position, the upper jaws 78, 80 are closed to grip one of the two severed reinforcing film strips 4 and, likewise, the lower jaws 79, 81 are closed to grip the other severed reinforcing film strip 73. In the open position, both the upper and lower pairs of jaws 78, 80; 79, 81 are open to release the two reinforcing film pieces 4, 73. A compression spring 84 (FIG. 2) is mounted between the pivotable jaws 80, 81 to normally urge their gripping or front ends 85, 86 away from one another (open position). When a tapering cam portion 91 of the actuator cam 90 is inserted, by the action of a pushing piston 96, into a space 89 between the two pivotable jaws 80, 81 at their rear ends 87, 88 remote from the first working station, the gripping ends 85, 86 of the pivotable jaws 80, 81 are moved toward one another against the biasing force of the spring 84 (closed position). In FIG. 1, when the pushing piston 96 is moved from its solid line position to its phantom line position, the cam portion 91 of the actuator cam 90 is retracted from the space 89 between the pivotable jaws' rear ends 87, 88 by a pair of compression springs 94, 95 each mounted between a rear flange 92 of the actuator cam 90 and a covering 93 (FIG. 2).

In operation, in FIGS. 1 and 2 a pair of continuous reinforcing film strips 3, 5 is clamped between the upper first jaw 14 and the upper second jaw 22 and between the lower first jaw 15 and the lower second jaw 23, respectively, under the biasing force of the respective compression springs 24, 25. With the two film strips 3, 5 thus clamped by these clamping jaws 14, 15, 22, 23, as the reciprocating piston rod 12 is moved forwardly, the slide 10 is moved in the direction of an arrow A along the guide block 6. When the slide 6 approaches near its advanced position (not shown), the rollers 32, 33 of the upper and lower second jaws 22, 23 roll on and along the cam surfaces 30, 31 of the cam plates 28, 29, respectively, causing the upper and lower second jaws 22, 23 to be moved in the directions of arrows C and D, (FIG. 3) respectively, against the biasing force of the respective springs 24, 25 until the transverse recesses 51, 52 of the upper and lower jaws 22, 23 are horizontally aligned with the projections 43, 44 of the locking members 38, 39. This alignment allows the locking members 38, 39 to be moved backwardly, i.e. leftwardly in FIG. 4, under the biasing force of the springs 49, 50, respectively. Each projection 43, 44 is thereby received in the respective transverse recess 51, 52, locking the second clamping jaws 22, 23 in the "releasing" position. Thus one step feed of the two film strips 3, 5 has taken place.

Then, the pusher 66 is lowered to push the cutters 62, 63 downwardly against the biasing force of a pair of extension springs 67, 68, causing the cutters 62, 63 to be pivotally moved to sever a pair of reinforcing film pieces 4, 73 from the two continuous film strips 3, 5, respectively. During that time, the continuous film strips 3, 5 are held in place between a lowered upper pressure pad 60 and the fixed central plate 55 and between the latter and a raised lower pressure pad 61 (FIG. 2), respectively, each pressure pad 60, 61 being connected to a reciprocating piston rod 58, 59 projecting from a jig cylinder 56, 57.

The double gripper is moved to its advanced position (FIG. 2), whereupon the actuator cam 90 is pushed by the piston 96 and its cam portion 91 thereby enters the space 89 between the rear ends 87, 88 of the second upper and lower grip members 80, 81, thus causing both the upper grip members 78, 80 and the lower grip members 79, 81 to grip the respective leading ends 69, 70 of the two severed reinforcing film pieces 4, 73. The gripper 74 is then returned to its original or retracted position (FIG. 1), bringing the two reinforcing film pieces 4, 73 to the first working station where the ultrasonic horn 97 and the shaping die 98 are vertically aligned with one another.

Substantially concurrently with the retraction of the gripper 74, the ultrasonic horn 97 and the shaping die 98 are moved toward one another to press the two reinforcing film pieces 4, 73 against opposite surfaces of the fastener chain 1 while the latter is at rest. The reinforcing film pieces 4, 73 are thereby fused to the opposed fastener stringers only at their inner marginal areas, and also to shape such fused portions into a suitable form.

Then, the piston 96 is moved from its advanced position (solid lines in FIG. 1) to its retracted position (phantom lines in FIG. 1), allowing the cam portion 91 of the actuator cam 90 to be retracted out of the space 89 between the rear ends 87, 88 of the grip members 80, 81 under the biasing force of the springs 94, 95. This retraction of the actuator cam 90 causes the gripper 74 to open, releasing the two reinforcing film pieces 4, 74. Substantially concurrently with the retraction of the actuator cam 90, the ultrasonic horn 97 and the shaping die 98 are moved away from one another. Subsequently, when the reinforcing film pieces 4, 73 partially fused to the fastener chain 1 arrive at the second station as the fastener chain 1 is further moved, the heating die 100 and the heating die 99 are moved toward one another to apply pressure and heat to the reinforcingf film pieces 4, 73 and the opposed fastener stringers at their superposed areas except the fused and shaped inner marginal portions.

Meanwhile, with the second clamping jaws 22, 23 locked in the "releasing" position, the slide 10 is returned, in response to the backward stroke of the reciprocating piston rod 12, to its original or retracted position (FIGS. 1 and 2). By that time the upper pressure pad 60 and the pusher 66 are returned to their raised position, and the lower pressure pad 61 is returned to its lowered position.

At the end of the reciprocating piston rod's backward stroke, the locking members 38, 39 are struck on their respective upstream ends by the pair of fixed rods 53, 54, resepectively, to be moved or pushed thereby from the "locking" position to the "unlocking" position against the biasing force of the respective springs 49, 50, thus allowing the second clamping jaws 22, 23 to be moved from the "releasing" position to the "clamping" position.

With the intermittent feed mechanism thus constructed, the length or distance which the continuous film strips 3, 5 are to be fed in a single step can be changed or adjusted by simply changing the position of the cam plates 28, 29 longitudinally of the guide block 6.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A mechanism for intermittently feeding a continuous tape-like article to a slide fastener chain, said mechanism comprising:

(a) a fixed elongated guide block for guiding the tape-like article along a longitudinal path;

(b) a slide supported by said guide blcok and movable relatively thereto in parallel relation to said longitudinal path, said slide having a first clamping jaw projecting therefrom for supporting the tape-like article on one surface thereof;

(c) means for reciprocably moving said slide between an advanced position and a retracted position along said guide block;

(d) a bracket secured to said slide and carrying a second clamping jaw movable relatively to said bracket perpendicularly to said longitudinal path between a "clamping" position in which said second clamping jaw is disposed close to said first clamping jaw to clamp therewith the tape-like article, and a "releasing" position in which said second clamping jaw is disposed away from said first clamping jaw to release the tape-like article;

(e) a first spring hereinafter called first spring acting between said bracket and said second clamping jaw and normally urging the latter to said "clamping" position;

(f) a cam plate disposed in a traveling path of said second clamping jaw at an adjustable position adjacent to a downstream end of said traveling path, said cam plate being engageable, when said slide approaches near said advanced position, with said second clamping jaw to cause the latter to be moved from said "clamping" position to said "releasing" position against the biasing force of said first spring;

(g) locking means carried on said bracket and operable, when said clamping jaw comes to said "releasing" position, to lockingly engage said second clamping jaw; and (h) unlocking means disposed adjacent to an upstream end of said traveling path of said second clamping jaw and operable, when said slide approaches near said retracted position, to cause said locking means to move out of locking engagement with said second clamping jaw, which is thereby allowed to return to said "clamping" position under force from said first spring.

2. A mechanism for intermittently feeding a continuous tape-like article, said mechansim comprising:

(a) a fixed elongated guide block for guiding the tape-like article along a longitudinal path;

(b) a slide supported by said guide block and movable relatively thereto in parallel relation to said longitudinal path, said slide having a first clamping jaw projecting therefrom for supporting the tape-like article on one surface thereof;

(c) means for reciprocably moving said slide between an advanced position and a retracted position along said guide block;

(d) a bracket secured to said slide and carrying a second clamping jaw movable relatively to said bracket perpendicularly to said longitudinal path between a "clamping" position in which said second clamping jaw is disposed close to said first clamping jaw to clamp therewith the tape-like article, and a "releasing" position in which said second clamping jaw is disposed away from said first clamping jaw to release the tape-like article, said second clamping jaw having a transverse recess;

(e) a first spring acting between said bracket and said second clamping jaw and normally urging the latter to said "clamping" position;

(f) a cam plate disposed in a traveling path of said second clamping jaw at an adjustable position adjacent to a downstream end of said traveling path, said cam plate being engageable, when said slide approaches near said advanced position, with said second clamping jaw to cause the latter to be moved from said "clamping" position to said "releasing" position against the biasing force of said first spring;

(g) locking means carried on said bracket and operable, when said clamping jaw comes to said "releasing" position, to lockingly engage said second clamping jaw, said locking means comprising a locking member slidably mounted on said bracket and having a projection engageable with said transverse recess, when said second clamping jaw is in said "releasing" position, said locking member being movable, on said bracket with respect to said second clamping jaw in parallel relation to said longitudinal path of the tape-like article, between a "locking" position in which said projection is received in said transverse recess, and an "unlocking" position in which said projection is retracted out of said transverse recess; and (h) unlocking means disposed adjacent to an upstream end of said traveling path of said second clamping jaw and operable when said slide approaches near said retracted position, to cause said locking means to move out of locking engagement with said second clamping jaw, which is thereby allowed to return to said "clamping" position under force from said first spring.

3. A mechanism according to claim 2, said cam plate having a cam surface slanting divergently downstream with respect to the longitudinal path of the tape-like article, said said second clamping jaw having a roller mounted thereon and rollable on and along said cam surface when said second clamping jaw passes said cam plate.

4. A mechanism according to claim 2, including a second spring hereinafter called second spring acting between said bracket and said locking member and normally urging the latter to said "locking" position, said unlocking means comprising a fixed rod engageable, when said slide is returned to said retracted position, with said locking member to cause the latter to be moved from said "locking" position to said "unlocking" position against the biasing force of said second spring.

5. A mechanism according to claim 2, said slide-moving means comprising a fluid-pressurized cylinder having a reciprocating piston rod connected to said slide.

* * * * *